March 24, 1942.  A. CIHAK  2,277,304
CLEANER FOR POTATO DIGGING BLADES
Filed Oct. 25, 1940  2 Sheets-Sheet 1
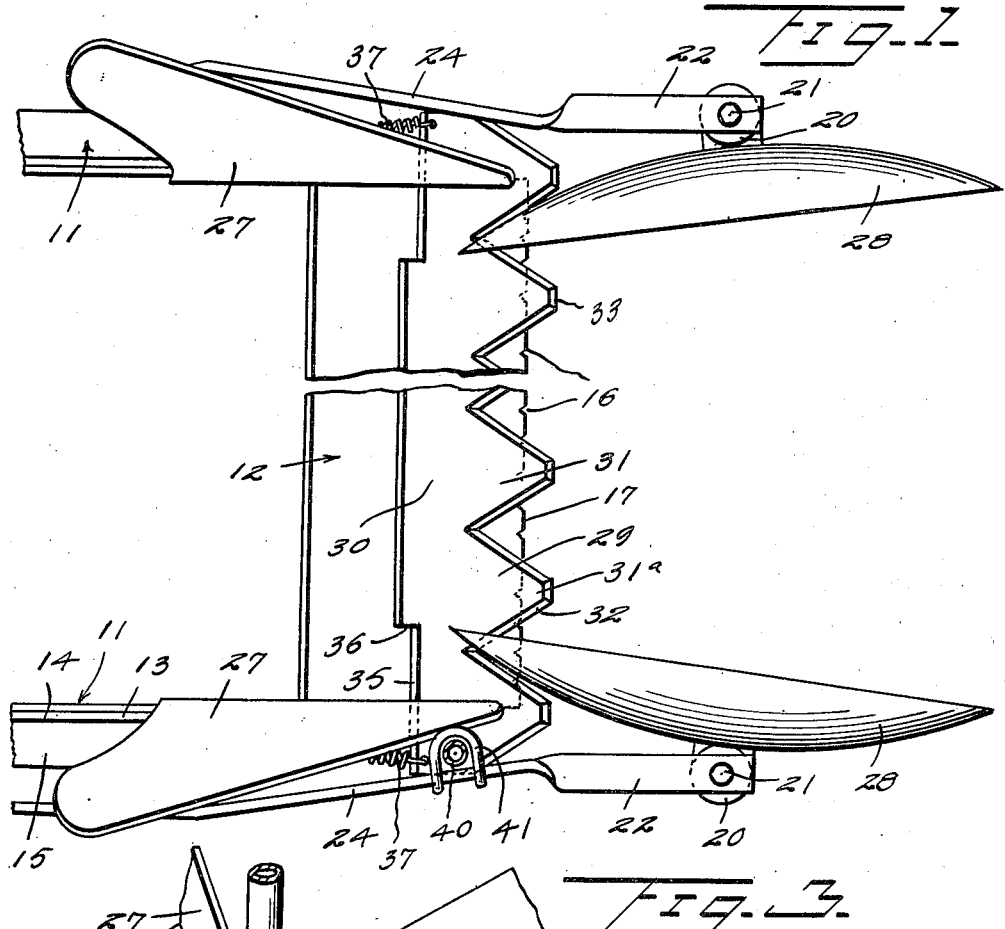
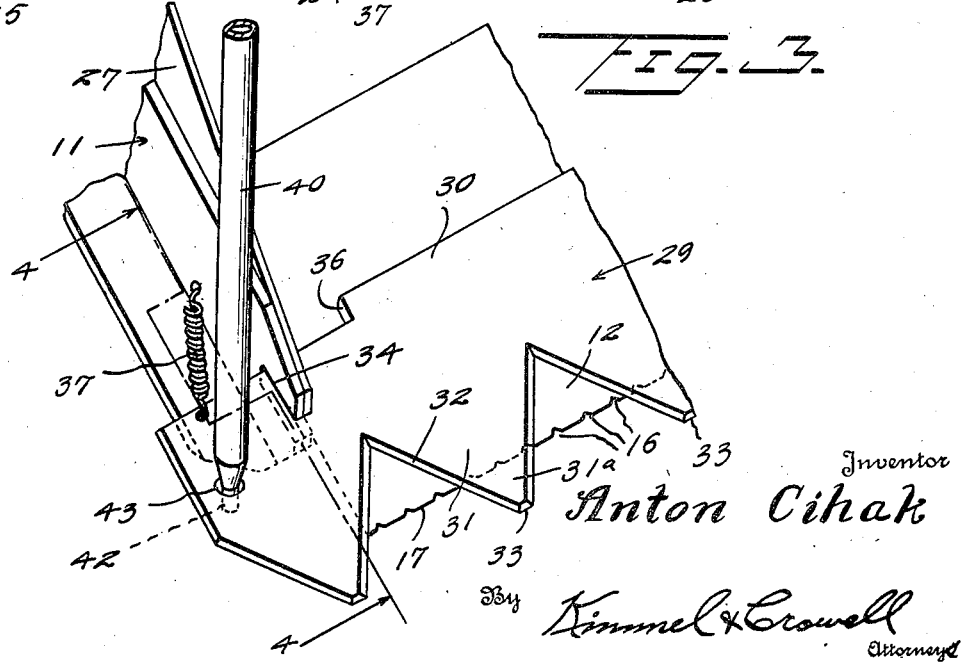
Inventor
Anton Cihak
By Kimmel & Crowell
Attorneys

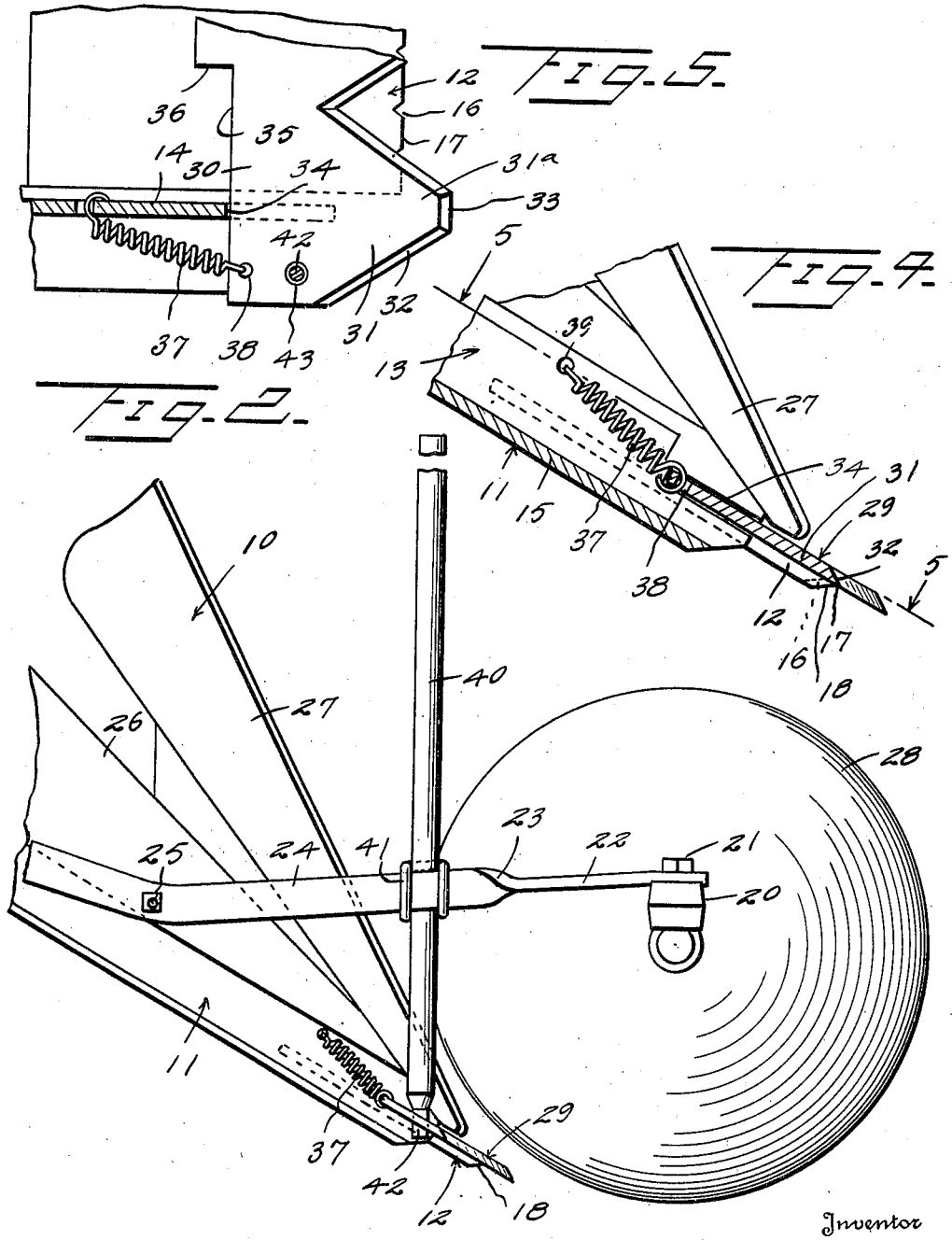

Patented Mar. 24, 1942

2,277,304

UNITED STATES PATENT OFFICE 2,277,304

CLEANER FOR POTATO DIGGING BLADES

Anton Cihak, Culver, Ind.

Application October 25, 1940, Serial No. 362,849

10 Claims. (Cl. 55—53)

This invention relates to potato digging machines and more particularly to a cleaning device for use on the digging blade of a digger.

An object of this invention is to provide in combination with a potato digging blade, a cleaning device which is mounted on the digging blade in such a manner that the cleaning device can be shifted or moved relative to the digging blade so as to remove the roots or other articles which are looped over the forward edge of the digging blade.

Another object of this invention is to provide a digging blade cleaner in the form of an attachment which may be mounted on a digging blade.

A further object of this invention is to provide a digging blade cleaner in the form of an attachment for the digging blade which may be manually or mechanically operated by a power connection with the power device associated with the digger.

A still further object of this invention is to provide a digging blade cleaner for a potato digging blade wherein a portion of the cleaning blade is adapted to project forwardly from the digging blade and may coact with the digging blade in digging potatoes as the machine is moving over the ground.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a top plan partly broken away of the digging portion of a potato digger having a blade cleaning means mounted on the digging blade.

Figure 2 is a fragmentary side elevation of the structure shown in Figure 1.

Figure 3 is a fragmentary perspective view of one end of the device.

Figure 4 is a fragmentary sectional view taken on the line 4—4 of Figure 3.

Figure 5 is a fragmentary sectional view taken on the line 5—5 of Figure 4.

Referring to the drawings, the numeral 10 designates generally a potato digging machine which includes a downwardly and forwardly inclined elevating frame structure 11 which may have an endless conveyor associated therewith. The potato digging structure 10 may be of any conventional type embodying the use of a conveyor which receives the potatoes from the digging blade, and one type of potato digging machine with which the hereinafter described invention may be combined is shown in Patent No. 1,836,172 which issued December 15, 1931.

A digging blade generally designated as 12 is secured at the opposite ends thereof to downwardly and forwardly directed side frame members 13. The side frame members 13 may be constructed in the form of angle bars which have one side 14 thereof vertical and the other side 15 extending laterally. The digging blade 12 at its forward edge is formed with a plurality of V-shaped rearwardly projecting notches 16 which form digging teeth 17 between each pair of notches 16. The digging teeth 17 have straight front edges, and these front edges may be sharpened by beveling the underside of the blade 12 as shown at 18.

A rotating disc 28 is rotatably carried by a bearing member 20 which is secured by a fastening means 21 to the forward end of a disc supporting bar 22. The disc supporting bar 22 is secured in any suitable manner to the conveyor frame structure 11 and in the present instance one end of the bar 22 is twisted as at 23 rearwardly from the forward edge thereof so that the forward portion of the bar 22 will be substantially horizontal and the rear portion 24 thereof will be vertical or in edgewise position. The rear portion 24 of the disc supporting bar 22 may be secured by fastening means 25 to the side members 26 of the conveyor member 11. A wing 27 is secured to the side members 26 rearwardly from the disc 28 which is rotatably carried by the bearing 20.

In order to provide a means whereby the forward edge of the digging blade 12 may be cleaned during the movement of the blade 11 through the ground, I have provided a digging blade cleaning member generally designated as 29, which in the present instance, is mounted on top of the digging blade 12. The cleaning blade 29 comprises a blade body 30 which on its forward edge is provided with V-shaped teeth 31 having beveled side edges 32 and preferably the forward ends of the blades 31 terminate in a beveled blunt point 33.

The point 33 is beveled oppositely from the bevel 18 of the blade 12 and the bevel 32 on the opposite sides of each blade 31 provides a means whereby the dirt passing over the digging blade 12 may readily slide over the upper surface of the cleaning blade 29. The teeth 31 carried by the body 30 project partly beyond the forward edge 17 of the digging blade 12 and partly rearwardly from the front edge 17 of the blade 12. That portion of each blade 31 which projects forwardly from the blade 12 provides a supplemental digging blade structure which coacts with the blade 12 in loosening the dirt and in digging the potatoes.

The blade member 29 is transversely slidable in slots 34 which are formed in the forward ends of the flanges 14 of the angle members 13. Preferably the rear edge of the body 30 of the blade 29 at the opposite ends thereof is formed with a cutout 35 which slidably engages in a notch or slot 34. The cutout 35 forms a right angular shoulder 36 inwardly from the outer edge of the body 30, which constitutes a stop and which is engageable with the inner side of the flange 14 so as to limit the lateral shifting of the body 30 with respect to the blade 12.

The body 30 is yieldably held in the notches 34 of the flanges 14 by means of a pair of springs 37 constituting resilient couplers. Each spring 37 has the forward end thereof mounted in an opening 38 formed in the body 30 and the opposite end of each spring 37 is secured to a flange 14 in an opening 39 formed in the flange 14 rearwardly from the notch 34. In this manner, when it is desired to remove the cleaning blade 29, it is only necessary to disconnect the two springs 37 from either the blade body 30 or the two flanges 14 and then move the body 30 forwardly out of engagement with the notches or slots 34.

The blade 29 in the present instance is shifted lengthwise of the blade 12 by means of a manually operable blade shifting lever 40 which is rockably carried by a U-shaped lever mounting member 41 which is carried by the rear portion 24 of the disc supporting bar 22. The lever 40 in the present instance may be constructed out of pipe, the mounting means 41 constituting a fulcrum for the lever 40 and the lower end of the lever 40 may be provided with a reduced stud 42 which loosely engages in an opening 43 formed in the adjacent end of the body 30.

The opening 43 is of sufficient size so that the stud 42 may be tilted back and forth relative to the blade 29 as the lever 40 is rocked transversely of the digging machine. It will be understood that while the blade 29 is here shown as being shiftable by a manually operable lever, the blade 29 may be connected by a suitable crank and linkage to a moving part of the potato digger in order that the cleaning member may be mechanically operated as the digging machine is moved over the ground and the digging blade is engaged in the digging of the potatoes. This mechanical connection with an operating part of the digging machine may also include a conventional clutching mechanism for selectively actuating the cleaning blade 29.

In the use and operation of this digging blade cleaner, the potato digging machine may be operated in the normal manner wherein the digging blade 12 is lowered to a digging position and the machine moved over the ground with the blade 12 loosening the dirt and removing the potatoes. Under normal conditions, the cleaning blade 29 may be left stationary and in this position, the projecting portions 31a of each blade 31 will coact with the digging blade 12 in loosening the dirt and also in removing the potatoes from the ground. However, in the event any roots adhere to the digging blade 12 by looping over the forward edge 17 thereof, these roots may be cut off from the blade 12 by reciprocating the cleaning blade 29 through the rocking of the blade operating lever or member 40.

Preferably the roots are shifted lengthwise of the blade 12 during the time that the blade 12 is disposed beneath the upper surface of the ground so that the pressure of the dirt against the blade 12 will have a tendency to force the looped articles against the cutting edge 17 so that lateral shifting of the cleaning blade 29 will shift any articles looped over those portions of the blade 12 disposed between the blades 31 of the cleaning member 29 and effect a cutting of these articles at the looped portions thereof.

The cleaning member 29 will thus maintain the cutting edge of the digging blade 12 clean so as to prevent any roots or stringy articles looping over and collecting on the blade 12. The cleaning blade 29 may be readily removed from the digging blade 12 by releasing the springs 37 and then sliding the blade 29 forwardly. The lower end of the blade operating lever 40 is loosely mounted in the opening 43 so that the removal of the blade 29 by forward shifting thereof will release the blade 29 from the operating lever 40.

What I claim is:

1. In a potato digging machine including a downwardly inclined digging blade provided with a substantially straight forward edge; a downwardly inclined blade cleaning member disposed in superimposed relation with respect to said blade, means slidably mounting said cleaning member on said blade and including resilient couplings for the ends of said member, and means for shifting said member relative to said blade.

2. In a potato digging machine including a downwardly inclined digging blade provided with a substantially straight forward edge; a downwardly inclined blade cleaning member disposed in superimposed relation with respect to said blade, means slidably mounting said cleaning member on said blade and including resilient couplings for the ends of said member, said cleaning member including a plurality of teeth projecting partly forwardly of the forward edge of said blade and partly rearwardly thereof, and means for shifting said member relative to said blade.

3. In combination, a downwardly inclined potato cleaning blade having a substantially straight forward edge, a downwardly inclined toothed cleaning member slidable relative to said blade, the teeth of said member being disposed partly forwardly of and partly rearwardly of said forward edge, means for slidably supporting said member in superimposed relation with respect to the blade and including resilient couplings for the ends of said member, and means for shifting said member relative to blade.

4. In a potato digging machine, a downwardly inclined digging blade having a straight forward edge, a downwardly inclined cleaning member slidably engaging the upper surface of said member, said member including a flat body and a plurality of V-shaped teeth positioned partly forwardly of and partly rearwardly of said forward edge of said blade, means for slidably mounting and guiding said member in superimposed relation to said blade, resilient couplers between the ends of said member and said means, and means for shifting said member lengthwise of said blade.

5. In a potato digging machine including a downwardly inclined digging blade and downwardly inclined angle-shaped supporting members for said blade, each of said members including a forward end and having an elongated slot opening through the forward end thereof, a downwardly inclined blade cleaning member mounted on said blade and disposed with the opposite end portions thereof slidable in said slots, means yieldably holding said cleaning member in said slots, and means for shifting said cleaning member relative to said blade.

6. In a potato digging machine including a downwardly inclined digging blade and downwardldy inclined angle-shaped supporting members for said blade, each of said members including a forward end and having an elongated slot opening through the forward end thereof, a downwardly inclined blade cleaning member mounted on said blade and disposed with the opposite end portions thereof slidable in said slots, means yieldably holding said cleaning member in said slots, means for shifting said cleaning member relative to said blade, and means limiting the movement of said cleaning member.

7. In a potato digging machine including a digging blade and angle-shaped supporting members for said blade, each of said members including a forward end and having an elongated slot opening through the forward end thereof, a blade cleaning member comprising a flat body disposed with the opposite end portions thereof slidable in said slots, forwardly projecting blade cleaning teeth, integral with said body and projecting partly beyond the forward edge of said blade, means yieldably holding said cleaning member in said slots, and means for shifting said cleaning member relative to said blade.

8. In a potato digging machine including a digging blade having a substantially straight forward edge, angle-shaped supporting members for said blade, each member including a forward end and having an elongated forwardly opening slot in the forward end thereof, a blade cleaning member comprising an elongated flat body slidably engaging said blade, forwardly projecting blade cleaning teeth integral with said body and projecting partly beyond the forward edge of said blade, said body having cutouts in the rear edge thereof adjacent each end, the opposite ends of said body slidably engaging in said slots and the inner ends of said cutouts constituting stops to limit the lengthwise movement of said body, springs connected to the opposite end portions of said body and to said supporting members for slidably holding said body in said slots, and means for shifting said cleaning member relative to said blade.

9. In a potato digging machine including a digging blade having a substantially straight forward edge, angle-shaped supporting members for said blade, each member including a forward end and having an elongated forwardly opening slot in the forward end thereof, a blade cleaning member comprising an elongated flat body slidably engaging said blade, forwardly projecting blade cleaning teeth integral with said body and projecting partly beyond the forward edge of said blade, said body having cutouts in the rear edge thereof adjacent each end, the opposite ends of said body slidably engaging in said slots and the inner ends of said cutouts constituting stops to limit the lengthwise movement of said body, springs connected to the opposite end portions of said body and to said supporting members for slidably holding said body in said slots, a vertically disposed lever loosely engaging at the lower end thereof said body adjacent one end of said body, and means supporting said lever.

10. In a potato digging machine including a digging blade having a substantially straight forward edge, angle-shaped supporting members for said blade, each member including a forward end and having an elongated forwardly opening slot in the forward end thereof, a blade cleaning member comprising an elongated flat body slidably engaging said blade, forwardly projecting blade cleaning teeth integral with said body and projecting partly beyond the forward edge of said blade, said body having cutouts in the rear edge thereof adjacent each end, the opposite ends of said body slidably engaging in said slots and the inner ends of said cutouts constituting stops to limit the lengthwise movement of said body, springs connected to the opposite end portions of said body and to said supporting members for slidably holding holding said body in said slots, said body having an opening adjacent one end thereof, a vertically disposed operating lever for said cleaning member, a reduced stud carried by the lower end of said lever loosely engaging in said opening, and means pivotally supporting said lever intermediate the ends thereof.

ANTON CIHAK.